(12) United States Patent
Hoshino et al.

(10) Patent No.: US 10,101,549 B2
(45) Date of Patent: Oct. 16, 2018

(54) OPTICAL FIBER CABLE

(71) Applicant: FURUKAWA ELECTRIC CO., LTD., Tokyo (JP)

(72) Inventors: Yutaka Hoshino, Tokyo (JP); Noboru Okada, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/510,454

(22) PCT Filed: Jan. 13, 2015

(86) PCT No.: PCT/JP2015/050657
§ 371 (c)(1),
(2) Date: Mar. 10, 2017

(87) PCT Pub. No.: WO2016/042785
PCT Pub. Date: Mar. 24, 2016

(65) Prior Publication Data
US 2017/0285285 A1  Oct. 5, 2017

(30) Foreign Application Priority Data
Sep. 17, 2014  (JP) .................. 2014-188570

(51) Int. Cl.
*G02B 6/44* (2006.01)
(52) U.S. Cl.
CPC ........... *G02B 6/4403* (2013.01); *G02B 6/443* (2013.01)

(58) Field of Classification Search
None
See application file for complete search history.

(56) References Cited

U.S. PATENT DOCUMENTS

| 8,787,718 B2 | 7/2014 | Tanabe et al. | |
| 9,739,965 B2 | 8/2017 | Isaji et al. | |
| 2011/0110635 A1* | 5/2011 | Toge | G02B 6/4403 385/102 |
| 2014/0016905 A1 | 1/2014 | Tanabe et al. | |

FOREIGN PATENT DOCUMENTS

| JP | 2007-279226 A | 10/2007 |
| JP | 2010-008923 A | 1/2010 |
| JP | 2011-221163 A | 11/2011 |

(Continued)

OTHER PUBLICATIONS

International Search Report issued in PCT/JP2015/050657 dated Apr. 7, 2015.

(Continued)

*Primary Examiner* — Chad H Smith
(74) *Attorney, Agent, or Firm* — Marshall, Gerstein & Borun LLP

(57) ABSTRACT

Optical fiber ribbons each comprise a plurality of optical fiber strands bonded in parallel. In the optical fiber ribbons, adjacent optical fiber strands are bonded by bonding sections that are intermittently bonded at prescribed intervals. The positions of the bonding section for all optical fiber ribbons are mutually offset in the longitudinal direction. In other words, the longitudinal-direction positions of the bonding section for the optical fiber ribbons never exactly match.

3 Claims, 5 Drawing Sheets

(56) References Cited

FOREIGN PATENT DOCUMENTS

| | | |
|---|---|---|
| JP | 2012-208443 A | 10/2012 |
| JP | 2012-234122 A | 11/2012 |
| JP | 2013-054219 A | 3/2013 |
| JP | 2014-085592 A | 5/2014 |
| TW | 201331659 A | 8/2013 |
| TW | 201350950 A | 12/2013 |

OTHER PUBLICATIONS

Written Opinion issued in PCT/JP2015/050657 dated Apr. 7, 2015.
International Search Report issued in PCT/JP2015/050650 dated Apr. 14, 2015.
Office Action issued in U.S. Appl. No. 15/510,521, dated Sep. 8, 2017.
Office Action issued in Taiwan Patent Application No. 104101520 dated Jun. 1, 2018.

* cited by examiner

OPTICAL FIBER CABLE

TECHNICAL FIELD

This disclosure relates to an optical fiber cable in which a plurality of optical fiber strands are bonded in parallel.

BACKGROUND

As an optical fiber for transmitting numerous data at high speed, an optical fiber ribbon in which a plurality of optical fiber strands are arranged and bonded in parallel is used for simple cable storage and operation. In some optical fiber ribbons, parallel optical fiber strands are fixed and bonded by resin over the full length thereof. In other optical fiber ribbons, optical fiber strands are bonded to each other intermittently, such as Japanese Unexamined Patent Application Publication No. 2010-8923, for example.

With these intermittently bonded optical fiber ribbons, no large strain is given to the optical fiber ribbons when the optical fiber cable, which is packaged densely with optical fibers, is bent. This is because the optical fiber ribbon can move freely as a single core at the non-connected sections of the intermittently bonded optical fiber tape that is packaged in the cable.

When a plurality of the intermittently bonded optical fiber ribbons are inserted into a cable, the motion of the optical fiber ribbons may be impeded, depending on the positions of the bonding sections.

More particularly, it has been found out that, when the positions of the connected sections of the optical fiber ribbons overlap with each other completely, the motion of the optical fiber ribbons, which configures the intermittently bonded optical fiber tape, is impeded, deteriorating transmission characteristics.

SUMMARY OF THE DISCLOSURE

The presently described embodiments were achieved in view of such problems. The object of these embodiments is to provide an optical fiber cable that includes intermittently bonded optical fiber ribbons and has excellent transmission characteristics.

To achieve the above object, the presently described embodiments provide an optical fiber cable including a plurality of optical fiber ribbons and a coat layer that protects a plurality of the optical fiber ribbons. The optical fiber ribbon is formed of a plurality of aligned optical fiber strands. The adjacent optical fiber strands are bonded intermittently with each other along the longitudinal direction of the optical fiber strands, and positions of bonding sections of each of a plurality of the optical fiber ribbons, which are to be accommodated in the optical fiber cable, in the longitudinal direction of the optical fiber cable are shifted from each other.

When an end position of any one of bonding sections of a standard optical fiber ribbon, which is arbitrarily selected from a plurality of the optical fiber ribbons, is called as a standard bonding-section position and, for each of the optical fiber ribbons, the end position of the bonding section that is closest to the standard bonding-section position in the longitudinal direction of the optical fiber cable is called as a bonding-section position respectively, it is preferable that a range of shifting in the longitudinal direction of the optical fiber cable of the bonding-section positions, including the standard bonding-section position and all the respective bonding-section positions, is greater than or equal to half the length of the bonding section.

It is preferred that the bonding-section positions of at least one pair of the optical fiber ribbons in the longitudinal direction of the optical fiber cable do not overlap with each other.

According to an embodiment, when a plurality of the optical fiber ribbons are accommodated, the positions of the bonding section thereof in the longitudinal direction do not coincide with each other completely, and thus restraining force of each of the optical fiber ribbons is weak, preventing application of stress from being concentrated at one place.

In addition, if the maximum shifting distance between the bonding-section positions, including the standard bonding-section position and all the respective bonding-section positions, is greater than or equal to half the length of the bonding section, the restraint between each of the optical fiber ribbons can be further suppressed.

Furthermore, the bonding-section positions of at least one pair of the optical fiber ribbons in the longitudinal direction do not overlap with each other so that interference between the bonding sections is suppressed and the restrain on the optical fiber strands can be further suppressed.

The presently described embodiments can provide an optical fiber cable that includes intermittently bonded optical fiber ribbons and has excellent transmission characteristics.

DETAILED DESCRIPTION

Figure 1:
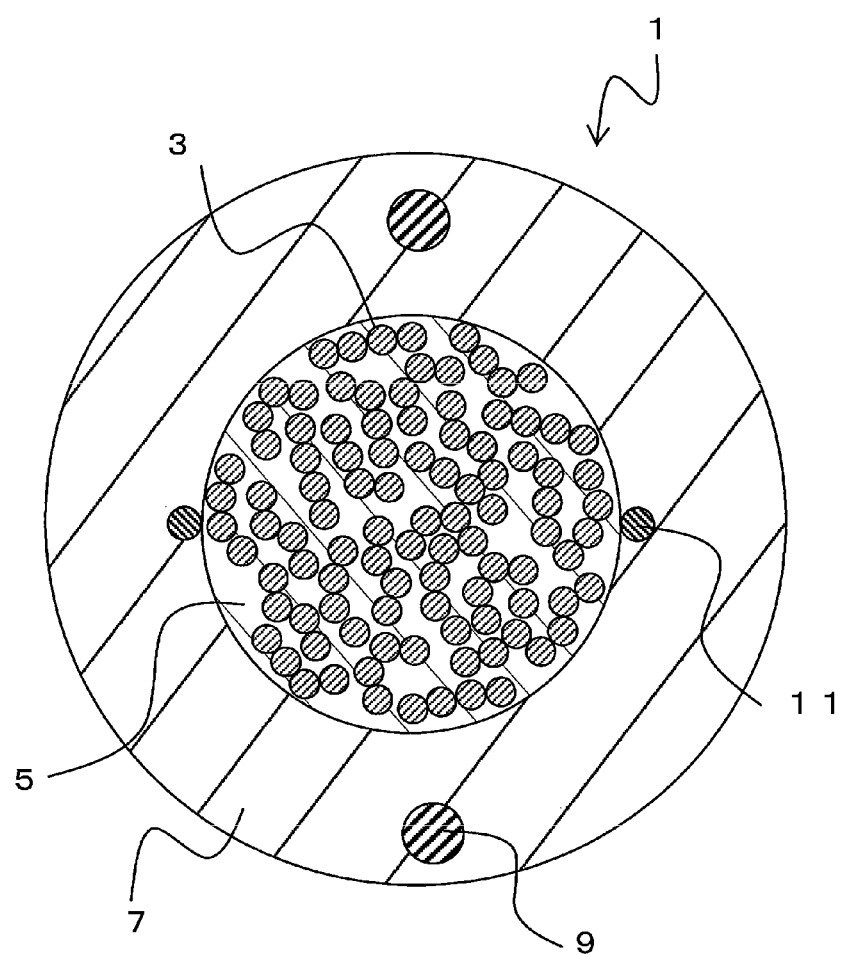
FIG. 1 is a cross sectional view showing an optical fiber cable 1.

Hereinafter, embodiments of will be described with reference to the accompanying drawings. FIG. 1 is a cross sectional view showing an optical fiber cable 1. The optical fiber cable 1 mainly includes optical fiber ribbons 3, a buffer layer 5, a coat layer 7, tension members 9, ripcords 11, and so on.

The optical fiber ribbon 3 is an optical fiber ribbon in which a plurality of optical fiber strands are arranged in parallel and integrated. The optical fiber ribbon 3 will be described in detail later.

The buffer layer 5 is provided on the outer periphery of the optical fiber ribbons 3. The buffer layer 5 protects the optical fiber ribbons 3 from external force and the like.

The coat layer 7 is formed on the outer periphery of the buffer layer 5. The coat layer 7 is a layer to coat and protect the optical fiber cable 1. The tension members 9 are provided inside the coat layer 7.

The tension members 9 are subjected to tensile force of the optical fiber cable 1. The tension members 9 are formed of, for example, steel wires or fiber reinforced plastics. In addition, ripcords 11 are embedded in the coat layer 7 if necessary.

The problem to be solved by the present embodiments arises notably when a ratio of the area occupied by fibers in a cable is high. Usually, in manufacturing a cable, the ratio of the area occupied by fibers (the ratio that cross sections of optical fibers occupy in the total cross section) is raised as much as possible to gain high space utilization, so the ratio of area occupied by optical fibers is 50% or more. The effect of the present embodiments can be obtained when applied to all these optical fibers that have 50% or more of the ratio of area occupied by optical fibers.

The optical fiber cable according to the presently described embodiments is not limited to the example shown in the drawing. The presently described embodiments can be applied to other types of optical fibers, such as loose tube cables, in which a tension member is arranged at the center, or slot type optical fibers.

Figure 2:
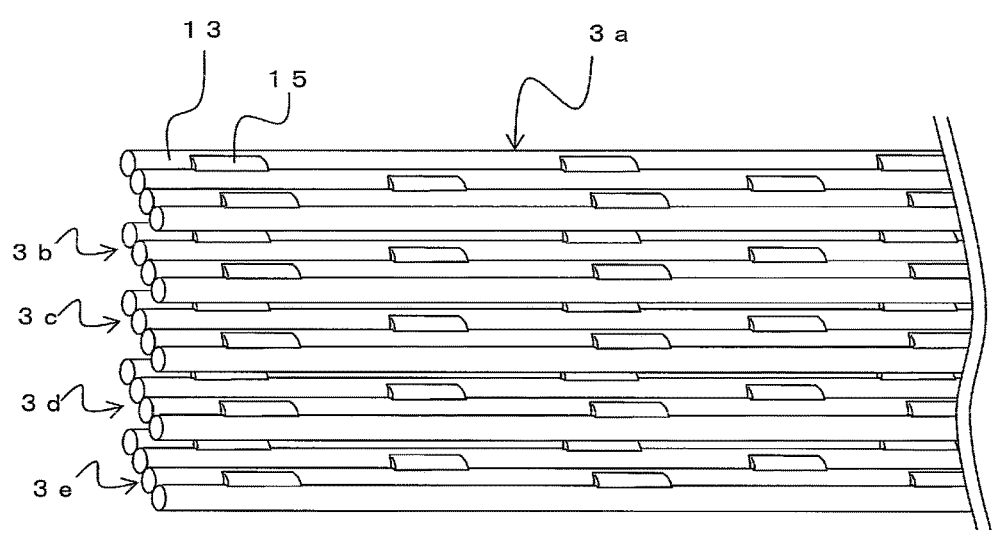
FIG. 2 is a drawing showing optical fiber ribbons 3*a*, 3*b*, 3*c*, 3*d*, and 3*e*.

FIG. 2 is a perspective view showing a plurality of the optical fiber ribbons 3 (hereinafter, optical fiber ribbons 3a, 3b, 3c, 3d, and 3e, respectively). Although the example shown in the drawing shows a state in which a plurality of the optical fiber ribbons 3a, 3b, 3c, 3d, and 3d are aligned, the directions and arrangement of each of the optical fiber ribbons 3a, 3b, 3c, 3d, and 3d are not uniform as shown in FIG. 1.

Also, although only five of the optical fiber ribbons 3a, 3b, 3c, 3d, and 3e will be described below as an example for simplifications, the descriptions below are to be applied to all the optical fiber ribbons 3 that are to be accommodated in the optical fiber cable 1.

Also, although the example in the descriptions hereinafter shows the optical fiber ribbons 3a, 3b, 3c, 3d, and 3e each of which is formed of four optical fiber strands 13, the presently described embodiments are not limited thereto and can be applied to any of the optical fiber ribbon formed of a plurality of the optical fiber strands.

Each of the optical fiber ribbons 3a, 3b, 3c, 3d, and 3e includes a plurality of the optical fiber strands 13 bonded in parallel.

In the optical fiber ribbons 3a, 3b, 3c, 3d, and 3e, the adjacent optical fiber strands 13 are intermittently bonded to each other at bonding sections 15 that are spaced at predetermined intervals. The bonding sections 15 between the adjacent optical fiber strands are positioned so as to be shifted from each other in the longitudinal direction of the optical fiber ribbons 3a, 3b, 3c, 3d, and 3e. For example, it is preferable that the bonding sections 15 adjacent to each other are formed so as to be shifted half a pitch in the longitudinal direction of the optical fiber ribbons 3a, 3b, 3c, 3d, and 3e.

Figure 3:
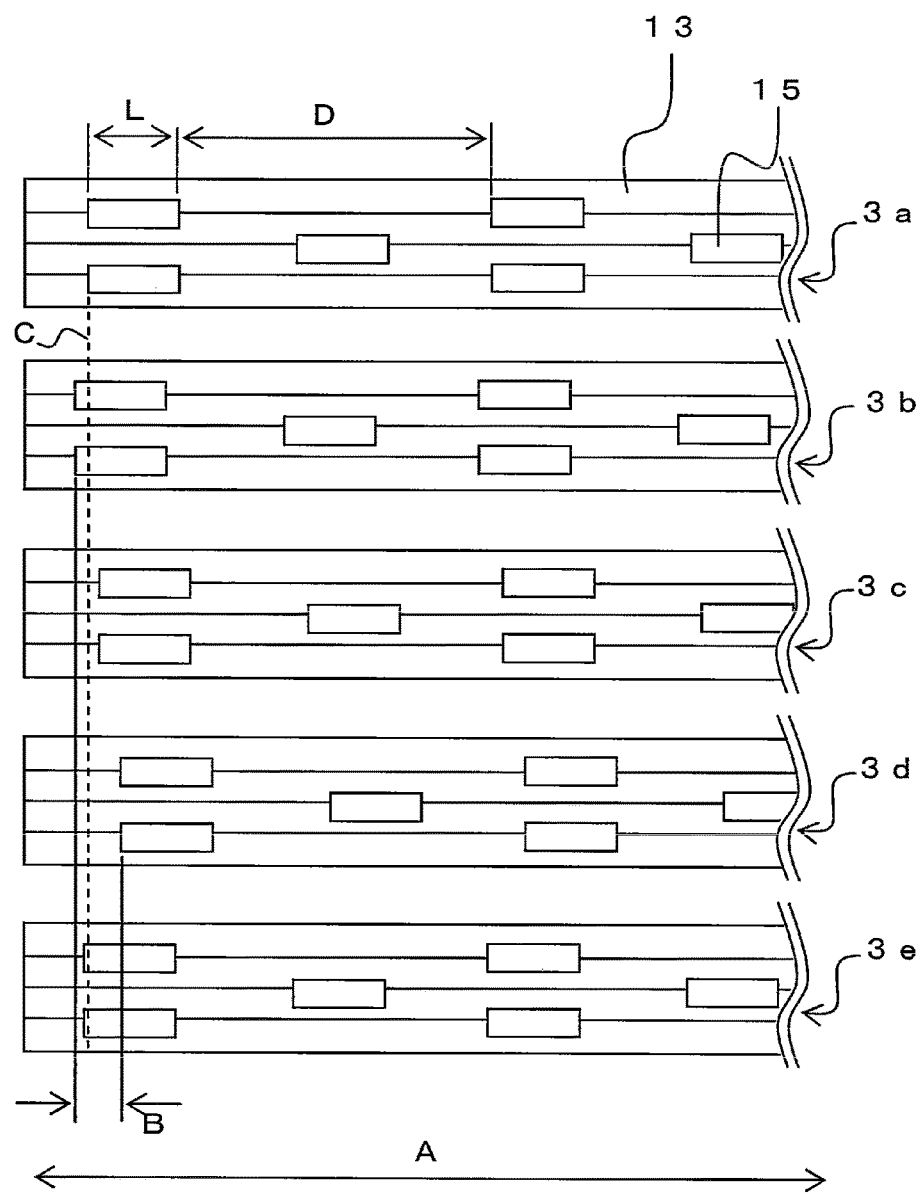
FIG. 3 is a drawing showing the optical fiber ribbons 3*a*, 3*b*, 3*c*, 3*d*, and 3*e*.

FIG. 3 is a plan view showing the optical fiber ribbons 3a, 3b, 3c, 3d, and 3e that are arranged side by side. The direction A in FIG. 3 is the longitudinal direction of the optical fiber cable 1. That is, FIG. 3 is a drawing showing the positions of the bonding sections 15 of each of the optical fiber ribbons 3a, 3b, 3c, 3d, and 3e in the longitudinal direction. Thus, the direction perpendicular to A in FIG. 3 indicates the same position along the longitudinal direction of the optical fiber cable 1.

The bonding sections 15 of the optical fiber ribbons 3a, 3b, 3c, 3d, and 3e all have the same length and are at the same pitch. In addition, for each of the optical fiber ribbons 3a, 3b, 3c, 3d, and 3e, the adjacent bonding sections 15 are shifted half the pitch from each other.

In the presently described embodiments, the positions of the bonding sections 15 of all the optical fiber ribbons 3a, 3b, 3c, 3d, and 3e are shifted from each other in the longitudinal direction. That is, the positions of the bonding sections 15 of the optical fiber ribbons 3a, 3b, 3c, 3d, and 3e in the longitudinal direction never coincide completely.

Since the positions of the bonding sections 15 in the longitudinal direction never coincide completely and are shifted from each other as above, any parts of the optical fiber ribbons 3a, 3b, 3c, 3d, and 3e are never restrained completely.

For example, if the positions of the bonding sections 15 of the adjacent optical fiber ribbons coincide completely by chance, stress may be concentrated on this part when bending transformation or the like is applied to the optical fiber cable 1. On the other hand, if the positions of the bonding sections 15 are shifted only slightly, this shifting, as a trigger, may lead to change the arrangement of the optical fiber ribbons and the like.

Here, the length of the bonding section 15 of the optical fiber ribbons 3a, 3b, 3c, 3d, and 3e in the longitudinal direction is L (mm). Also, the distance between the two bonding sections 15 in the longitudinal direction is D (mm). That is, in the optical fiber ribbons 3a, 3b, 3c, 3d, and 3e, all the optical fiber strands 13 are bonded to each other with the same D and L.

In addition, one of the optical fiber ribbons is appointed to be a standard optical fiber ribbon. In the example shown in FIG. 3, the optical fiber ribbons 3a is the standard optical fiber ribbon. Also, an end position (in the drawing, the end part on the left side is the end position) of any of the bonding sections 15 of the standard optical fiber ribbon is appointed to be a standard bonding-section position (C in the drawing).

In this case, B is a distance between the furthest positions (the foremost end and the rearmost end) among the end positions of the bonding sections 15 of the optical fiber ribbons 3a, 3b, 3c, 3d, and 3e, which are closest to the standard bonding-section position C. There may be a case in which the standard bonding-section position C is the foremost or the rearmost end.

In this case, if the maximum shifting amount B is small, the effect of shifting the positions of the bonding sections 15 of the optical fiber ribbons 3a, 3b, 3c, 3d, and 3e is small. For example, in the example shown in FIG. 3, the maximum shifting amount B is less than half the length L of the bonding section 15, and thus the effect on suppressing stress concentration is small.

Figure 4:
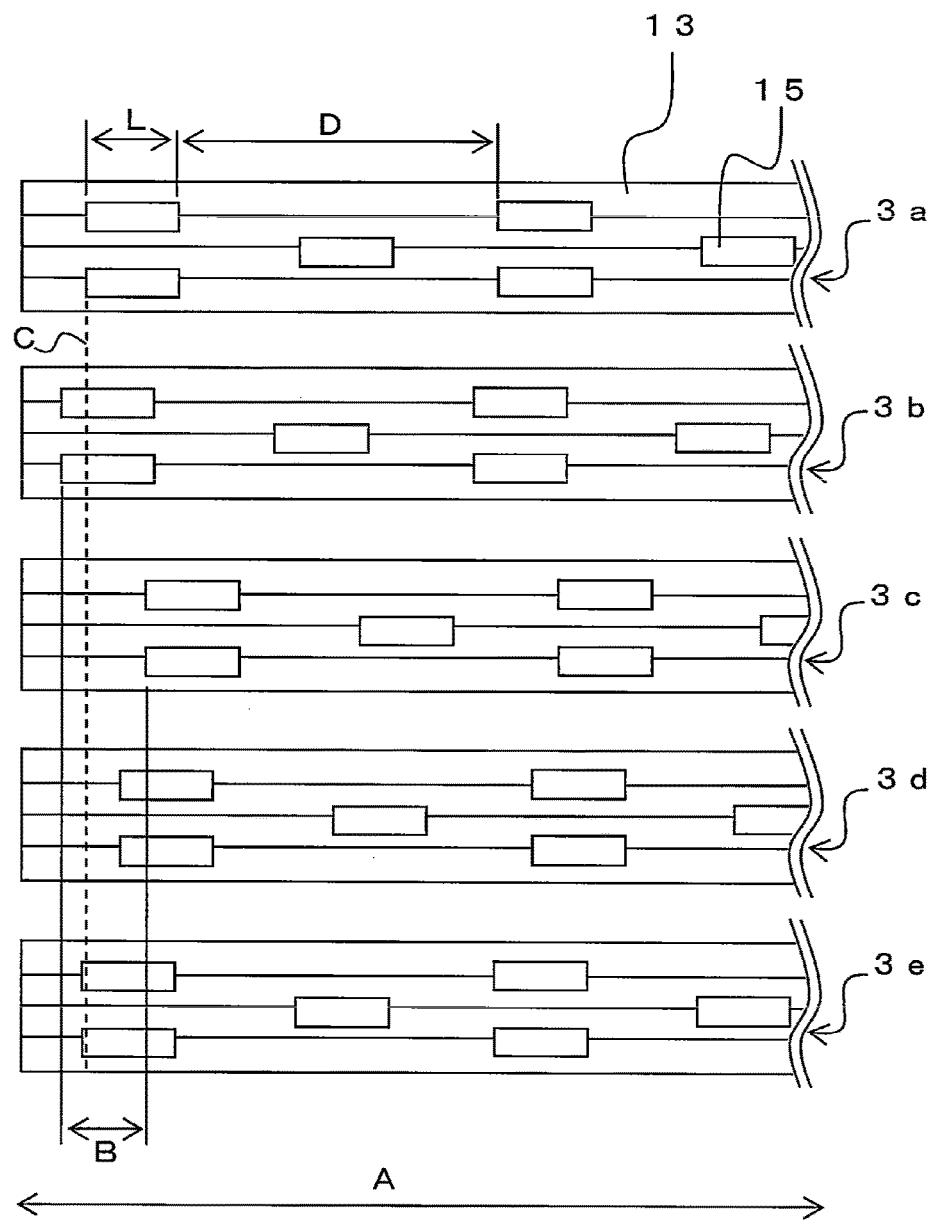
FIG. 4 is a drawing showing the optical fiber ribbons 3*a*, 3*b*, 3*c*, 3*d*, and 3*e*.

FIG. 4 is similar to FIG. 3, showing a state in which the shifting amount of the bonding sections 15 is varied. In the example shown in FIG. 4, the maximum shifting amount B is more than half the length L of the bonding section 15.

When the maximum shifting amount B is greater than half the length L of the bonding section 15, the effect on suppressing stress concentration is large. For example, the more of the bonding sections overlap, the more likely the increase in transmission loss or the like may occur, which is the problem to be solved by the presently described embodiments. Thus, if at least some of the bonding sections 15 of the optical fiber ribbons are shifted with half the length or more in the longitudinal direction, the interference between at least these bonding sections 15 of the optical fiber ribbons can be suppressed.

Further preferably, the shifting amount between all the optical fiber ribbons are greater than or equal to half the length L of the bonding section 15. In this way, all of the bonding sections 15 of the optical fiber ribbons do not overlap for more than the half of the length of the bonding section 15, and thus the effect on reducing the transmission loss is large.

In this case, a relationship:

$$(n-1) \times L/2 \leq (D-L)/2$$

is to be satisfied, where n is the number of the optical fiber ribbons to be accommodated. That is, it is required to satisfy a relationship: $nL \leq D$.

Figure 5:
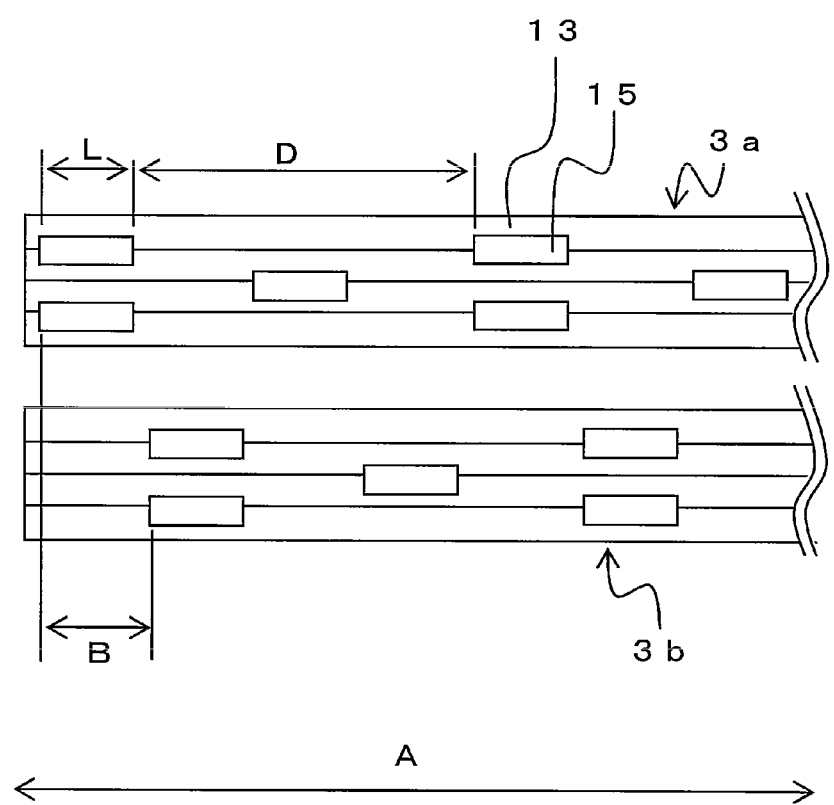
FIG. 5 is a drawing showing the optical fiber ribbons 3*a* and 3*b*.

FIG. 5 is similar to FIG. 3 (however, only the optical fiber ribbons 3a and 3b are shown for simplification), showing a state in which the shifting amount of the bonding sections 15 is further varied. In the example shown in FIG. 5, the bonding sections 15 do not overlap with each other at all. That is, the maximum shifting amount B is greater than or equal to the length L of the bonding section 15.

As above, when the bonding sections between at least a pair of the optical fiber ribbons do not overlap with each other at all, the effect on reducing the transmission loss is large.

Furthermore, it is preferable that the bonding sections between not just a pair but a plurality of pairs of the optical fiber ribbons do not overlap with each other at all. And further preferably, all the bonding sections do not overlap with each other at all.

In this case, a relationship:

$$(n-1) \times L \leq (D-L)/2$$

is to be satisfied, where n is the number of the optical fiber ribbons to be accommodated. That is, it is required to satisfy a relationship: $(2n-1)L \leq D$.

As above, when a plurality of the optical fiber ribbons are accommodated, the positions of the bonding sections 15 thereof do not coincide completely in the longitudinal direction. Thus, the restraining force on the optical fiber strands 13 forming each of the optical fiber ribbons is weak, which suppresses the application of stress from being concentrated at one place.

In addition, if the maximum shifting amount B is greater than or equal to half the length L of the bonding section, the restraint on the optical fiber strands 13 forming each of the optical fiber ribbons can be further suppressed.

Furthermore, by making sure that the positions of the bonding sections 15 of at least one pair of the optical fiber ribbons do not overlap with each other in the longitudinal direction, the interference between the bonding sections 15 can be suppressed and the restraint on the optical fiber strands 13 can be further suppressed.

Although the embodiments have been described referring to the attached drawings, the technical scope of presently described embodiments is not limited to the embodiments described above. It is obvious that persons skilled in the art can think out various examples of changes or modifications within the scope of the technical idea disclosed in the claims, and it will be understood that they naturally belong to the technical scope of the described embodiments.

What is claimed is:

1. An optical fiber cable comprising:
   a plurality of optical fiber ribbons which are to be accommodated in the optical fiber cable; and
   a coat layer that protects a plurality of the optical fiber ribbons, wherein:
   each of the optical fiber ribbons is formed such that a plurality of optical fiber strands are arranged in parallel and integrated;
   adjacent optical fiber strands are bonded intermittently with each other along the longitudinal direction of the optical fiber strands; and
   positions, in the longitudinal direction, of corresponding bonding sections in adjacent optical fiber ribbons, are shifted with respect to each other.

2. The optical fiber cable according to claim 1, wherein an end position of any one of bonding sections of a standard optical fiber ribbon, which is arbitrarily selected from a plurality of the optical fiber ribbons, is called as a standard bonding-section position and, for each of the other optical fiber ribbons, the end position of a bonding section that is closest to the standard bonding-section position in the longitudinal direction of the optical fiber cable is called as a bonding-section position respectively; and
   each shifting amount between two bonding-section positions, including the standard bonding-section position and all the respective bonding-section positions, is greater than or equal to half the length of the bonding section in the longitudinal direction of the optical fiber cable.

3. The optical fiber cable according to claim 1, wherein the positions of the bonding sections of at least one pair of the optical fiber ribbons do not overlap with each other in the longitudinal direction of the optical fiber.

* * * * *